US008281762B2

(12) United States Patent
Sicre et al.

(10) Patent No.: US 8,281,762 B2
(45) Date of Patent: Oct. 9, 2012

(54) INTERNAL COMBUSTION ENGINE WITH BEARING CAP DAMPENING

(75) Inventors: Amaury Sicre, Lyons (FR); Frederic Pichot, Saint-Priest (FR)

(73) Assignee: Renault Trucks, St Priest (FR)

( * ) Notice: Subject to any disclaimer, the term of this patent is extended or adjusted under 35 U.S.C. 154(b) by 591 days.

(21) Appl. No.: 12/520,557

(22) PCT Filed: Dec. 27, 2007

(86) PCT No.: PCT/IB2007/004467
§ 371 (c)(1),
(2), (4) Date: Jun. 22, 2009

(87) PCT Pub. No.: WO2008/078202
PCT Pub. Date: Jul. 3, 2008

(65) Prior Publication Data

US 2010/0059014 A1 Mar. 11, 2010

(30) Foreign Application Priority Data

Dec. 27, 2006 (WO) .................. PCT/IB2006/004195

(51) Int. Cl.
*F02F 7/00* (2006.01)
*F16F 15/08* (2006.01)

(52) U.S. Cl. ................................ 123/195 C; 123/195 H

(58) Field of Classification Search .............. 123/195 C, 123/195 H, 198 E; 181/204
See application file for complete search history.

(56) References Cited

U.S. PATENT DOCUMENTS 4,445,471 A * 5/1984 Hayashi .................... 123/198 E
5,107,809 A * 4/1992 Suh .......................... 123/195 H
6,044,818 A * 4/2000 Decuir ...................... 123/192.1
6,745,740 B1 * 6/2004 Decuir ...................... 123/192.1

FOREIGN PATENT DOCUMENTS

| | | | |
|---|---|---|---|
| EP | 005634 | A * | 2/1982 |
| EP | 0056347 | A2 | 7/1982 |
| EP | 0056588 | A | 7/1982 |
| FR | 2711186 | A1 | 4/1995 |
| GB | 2011998 | A | 7/1979 |
| GB | 2105784 | A | 3/1983 |
| JP | 55082835 | A | 6/1980 |
| JP | 57102540 | | 6/1982 |
| JP | 05195870 | A | 8/1993 |
| JP | 2004169596 | | 6/2004 |

OTHER PUBLICATIONS

International Search Report for corresponding International Application PCT/IB2007/004467.
Official Action from correspondingJapanese Application 2009-543546.

* cited by examiner

*Primary Examiner* — M. McMahon
(74) *Attorney, Agent, or Firm* — WRB-IP LLP

(57) ABSTRACT

An internal combustion engine has an engine block including a crankshaft which is mounted on the engine block by at least a first and a second main bearings, wherein the main bearings each include a first bearing portion and a second bearing portion, the second bearing portion being part of a bearing cap, wherein at least the first bearing cap is connected to the engine block or to the second bearing cap by at least one dampening structure, the structure including a first support portion fixed on the bearing cap, a second support portion fixed on the engine block or on an adjacent bearing cap, and a dampening portion including an elastomeric material which connects the two support portions.

18 Claims, 7 Drawing Sheets

INTERNAL COMBUSTION ENGINE WITH BEARING CAP DAMPENING

BACKGROUND AND SUMMARY

The invention relates to the field of internal combustion engines

By nature, combustion engines are noise-generating systems. The noise created by an engine can come from various sources, mainly excited by moving parts (crank-train, valve train, gears) and combustion (cylinder pressure, injection). Most of the noise created in an engine (except exhaust and ancillaries noise) originates or results in medium to high frequency vibrations in the engine's structure. Due to the fact that the engine structure is by nature very rigid in order to withstand the considerable forces developed by the engine, those vibrations propagate very easily into the whole structure. Moreover those engine excitations are strongly correlated, generating even more noise. Therefore, it is well known that there is an interest in providing means to lower internal vibrations or to counter the propagation of those vibrations inside engine structure.

One main localization of vibration transfers are the main bearings (crankshaft bearings), where combustion excitations (transmitted by piston and connecting rods, also by skirts and cylinder block) and inertial excitations of crank-train cross each other. Indeed, the internal combustion engine usually comprises a main engine block made of cast metal. As they have large external surfaces and less stiffness than upper part of the cylinder block, skirts are important noise sources. This main block comprises at least one cylinder, but more often four, six or eight cylinders wherein reciprocating pistons are able to travel back and forth along the cylinder axis, thereby providing within that the engine block variable volume combustion chambers in which the combustion process takes place. Each piston is connected to a crankshaft crankpin by a connecting rod which is articulated at its both ends on the piston and on the crankshaft. The crankshaft is mounted on the engine block by a number of main bearing journals so as to be able to rotate around a longitudinal crankshaft axis. The main bearing journals of the crankshaft are located axially between at least two crankpins so as not to interfere with the movements of the crankpins and of the corresponding end of the connecting rod. In modern high-performance engines, such as modern diesel engines, there can be one main bearing journal between each crankpin of the crankshaft. In other words, there can be the same number of main bearing journals as of the number of cylinders, plus one.

According to a usual construction technique, each main bearing journal of the crankshaft is mounted within a main bearing housing via a bearing bush. A main bearing housing is formed for one part directly on the engine block, and for the other part on a bearing cap which is removably attached to the engine block. Each part is usually in the form of a half cylinder oriented along the crankshaft axis. The bearing cap is usually essentially U-shaped, each free end of the U being bolted to the engine block. By construction, the bearing housing and more specifically the bearing cap are located at the lowermost portions of the engine block. Also by construction, the bearing housings have to withstand the complete force generated in the combustion chambers. This force being by nature cyclical, and the bearing housings being spaced from one another, the bearing housings and the bearing caps more specifically, are prone to vibrate,. As discussed above, these vibrations generate noise, but can also be a problem in terms of the proper functioning of the bearing.

In order to reduce vibrations generated at the bearings, various solutions have already been suggested. A first solution widely used is to connect all the bearing caps together by a rigid frame structure (so-called bedplate structure), most often made of metal, this frame structure being in turn tightly connected to the engine block. Thereby, the rigidity of the bearings is substantially increased so that the amplitude of the low frequency vibrations can be decreased. Nevertheless, this solution has the major drawback that the frame structure is rigid, so frequency of main vibrating modes increases and can generate more noise, and moreover tends to propagate bearing vibrations to the whole engine block.

Document FR-2.711.186 discloses an engine wherein the engine block has two sidewalls which extend vertically downwards from the engine block on each side of the crankcase and of the bearing caps. The sidewalls preferably have a dampening structure, and they are designed to be relatively flexible, so as to form a preferred vibration path. The bearing caps are all connected one to another by two rigid bars, forming an intended rigid structure. The lower edges of the sidewalk are connected to the bearing caps by viscous dampeners. Due to the geometry, it is clear that those dampers are mainly subject to traction and compression stresses along a transverse direction.

Document GB-2.105.784 discloses another type of dampening system for the bearing housings. In this document, the upper part of the bearing housing, and not the bearing cap, has a transversely extending protrusion. The dampening system comprises a tubular elastomeric element having an inner tubular ring and an outer tubular ring adhered thereto, the three elements having the same transversal axis. The outer ring is received within a corresponding cylindrical housing formed in the lateral side wall of the engine block which extends on one side of the bearings, said outer ring being in abutment in said housing in the direction of the bearing. A shaft portion extends transversely across the dampening system and abuts against the inner ring on its external side so that, once said the shaft is bolted onto the bearing housing protrusion, said shaft is not only tightly pressed against the protrusion, it also forces the outer ring of the dampening system against its abutment. Due to this construction, the elastomeric tubular ring is subject to shear stresses whenever there is a relative movement of the bearing housing with respect to the side wall along a transverse direction. It has been shown that an elastomeric dampener is efficient over a larger span of frequencies when it is subject to shear stresses rather than subject to traction and compression stresses. Therefore, the dampening system disclosed in the above-mentioned document may be efficient in dampening transverse movements, but it will not be as efficient in all the other directions, especially for vibrations occurring along the longitudinal axis of the crankshaft. Moreover, the dampening system of GB-2.105.784 is quite complex, especially from a manufacturing point of view. Indeed, the vertical side walls have to be provided with the corresponding housings and the geometry of the various components of the dampening system allow only for minimum tolerances in dimensions. Indeed, any variation in the dimension of a component along the transverse direction may result either in the elastomeric ring to be excessively constrained in its working direction, or in the elastomeric ring to be loose. In the first case, excessive wear will occur, while in the second case the elastomeric ring will be of no use at all and will even generate additional noise. Therefore, such a dampening system is very costly to implement (new cylinder block design, assembly time, etc. . . . ).

In view of the shortcomings of the above-mentioned solutions, it is desirable to provide a novel solution to dampen crankshaft bearing vibrations at a very reasonable cost, without having to redesign extensively the engine block and other components involved.

The invention provides, according to an aspect thereof, for an internal combustion engine having an engine block comprising at least one cylinder extending along a cylinder axis and a crankshaft which is mounted on the engine block by at least a first and a second main bearings so as to be rotatable around a longitudinal crankshaft axis, wherein said main bearings comprise each a first bearing portion and a second bearing portion, said second bearing portion being part of a bearing cap, and wherein said bearing cap is fixed on said engine block by fixing means, characterized in that at least the first bearing cap is connected to the engine block or to the second bearing cap by at least one dampening structure, said structure comprising a first support portion fixed on said bearing cap, a second support portion fixed on said engine block or on an adjacent bearing cap, and a dampening portion comprising an elastomeric material which connects the two support portions, and in that the dampening structure is configured so that any relative movement between the bearing cap and the engine block, or between two bearing caps, along a substantially horizontal direction, including longitudinal and transversal directions, results in the dampening portion being subject mainly to shear stress.

DETAILED DESCRIPTION

Figure 1:
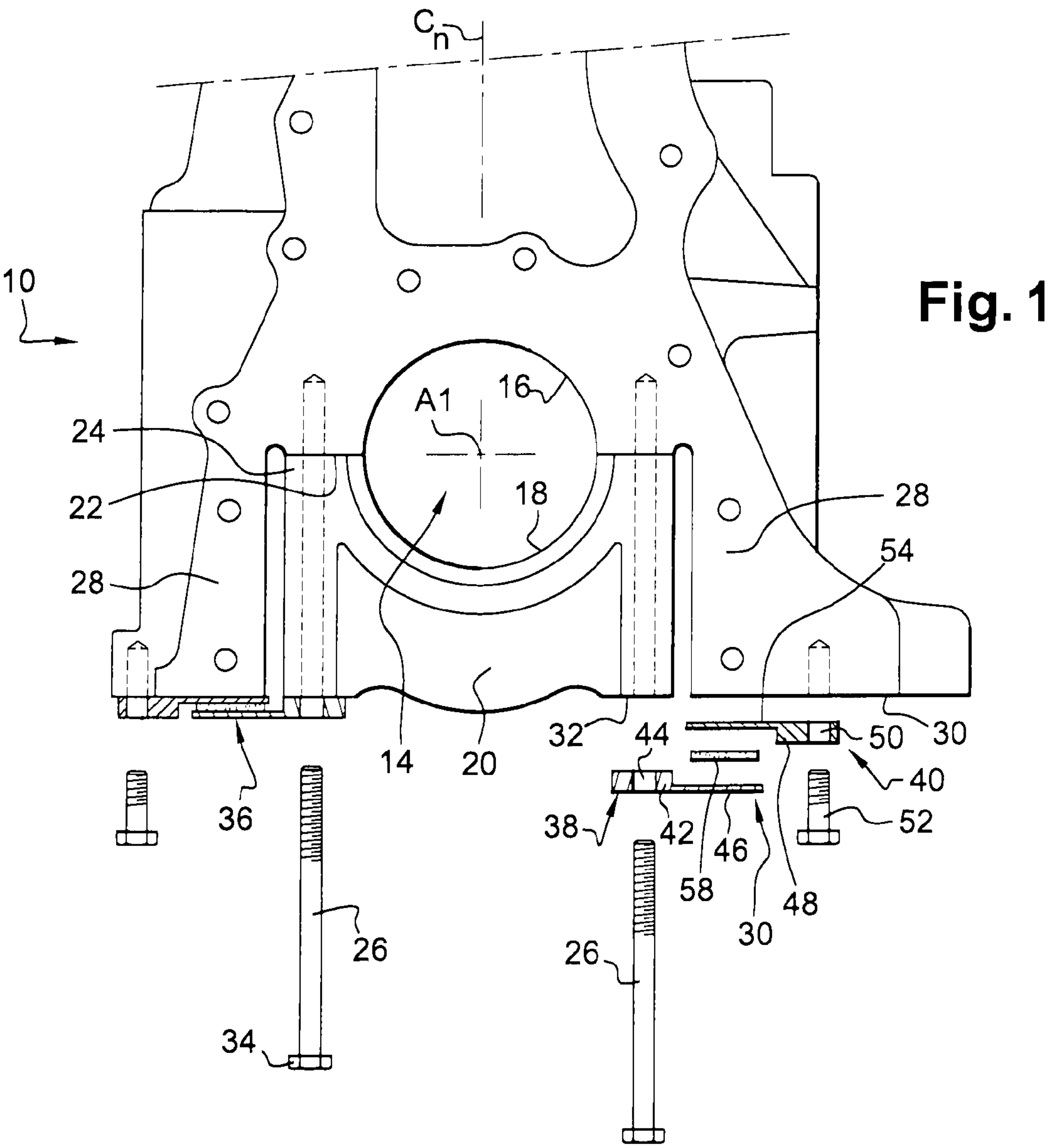
FIG. 1 is a transversal cutout view a part of an engine block with a dampening structure for a bearing cap according to the invention.
Figure 2:
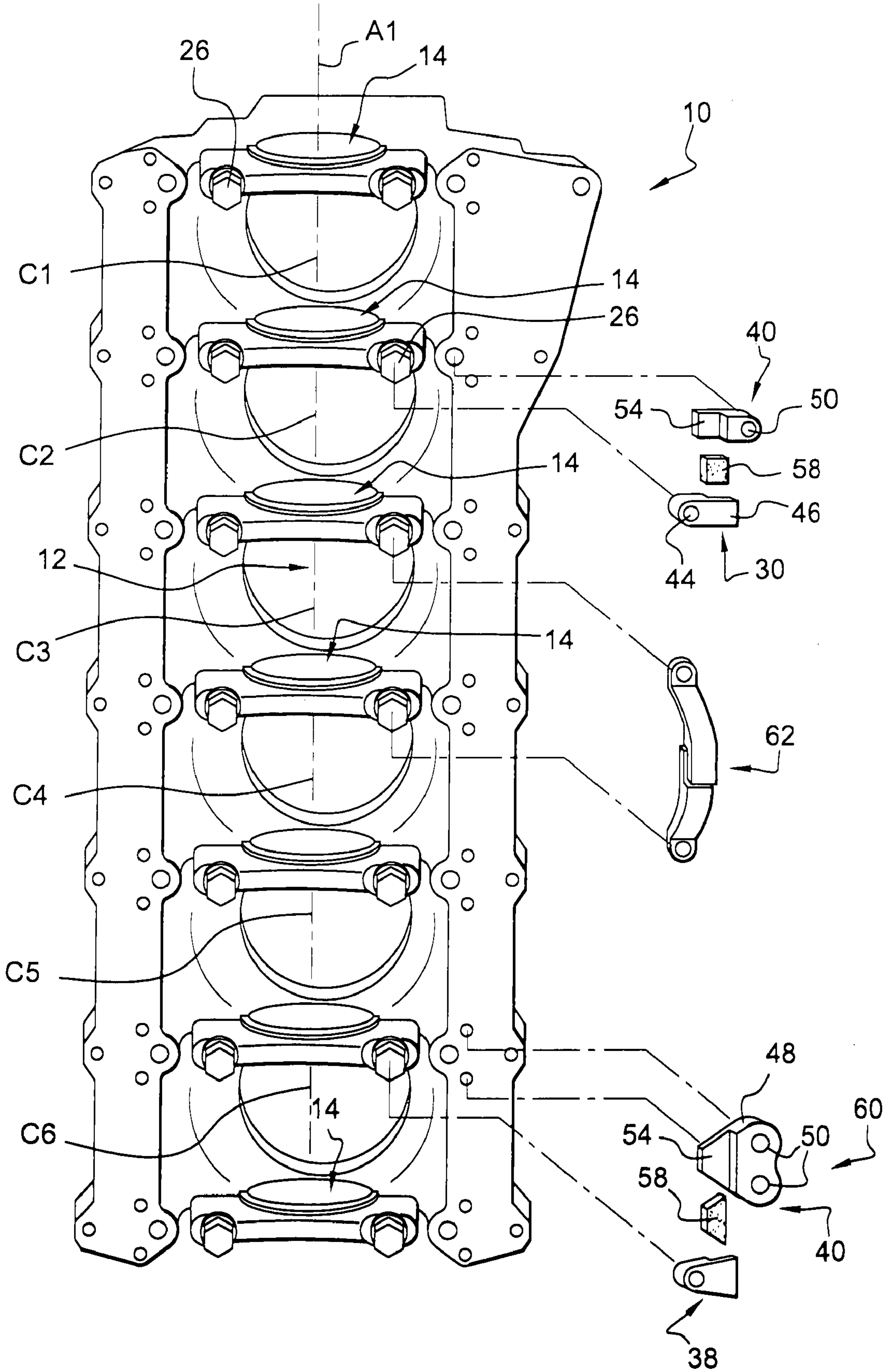
FIG. 2 is a schematic perspective view of an engine block from below, with several types of dampening structures for the bearing caps.

On FIGS. 1 and 2 is shown the cylinder block 10 of an internal combustion engine. This cylinder block is the main part of an engine block which can comprise other block elements, such as a cylinder head block, a rear plate, a flywheel housing, etc. In the example shown, the cylinder block is made in one piece from cast iron and includes the crankcase. Nevertheless in some cases, it can be made of several parts. This cylinder block 10 has six cylinder cavities 12 each extending along its own vertical axis C1 to C6. This cylinder block corresponds to an in-line six cylinder engine where all the cylinders are parallel one to the other, the axis C1 to C6 extending in a central vertical and longitudinal plane of the engine. In the following text, the terms relating to orientation, such as vertical, longitudinal, transversal, upper lower, left and right, etc., are used for convenience and in a relative sense. They refer to a conventional orientation of the engine as depicted on FIG. 1, but do not in any case constitute a limitation of the invention, as it is well known that an engine can be installed in various orientations in a vehicle compartment. The longitudinal direction is the direction of the axis of the crankshaft. The vertical direction is the direction of the cylinder axis in an in-line engine. The transversal direction is perpendicular to both longitudinal and vertical directions. Similarly, the invention, is not limited to in-line engines, and could be implemented in other engine geometries, such as in V-type engines. In such a case, the vertical direction will be that of the plane of symmetry on the V-shape.

On FIG. 1 is shown only the lower part of the cylinder block 10. On the lower side of the cylinder block, one can recognize seven main bearings 14 by which a crankshaft (not shown) is to be mounted in the engine, for example via bush bearings, so as to be rotatable along its longitudinal axis A1. Each main bearing 14 comprises a bearing housing separated into two portions. An upper portion 16 of the bearing housing is formed directly in the cylinder block, between two adjacent cylinders and at each longitudinal end the of the cylinder block. A lower portion 18 of the bearing housing is a formed within a removable bearing cap 20 which is to be bolted on to a lower face 22 of the cylinder block. The bearing housing as a whole is a cylinder having a longitudinal axis coincident with the axis A1 of the crankshaft. Each upper and lower portion 16, 18 of the bearing housing is therefore a half of that cylinder, on each side of a horizontal plane. The bearing cap 20 has therefore a basically U-shape turned upwards, each extremity 24 of the branches of the U being tightly bolted by two vertical fixing bolts 26 on the cylinder block so as to close the bearing housing. The bolts 26 are located at each left and right transverse extremity of the bearing caps and are engaged in corresponding through-holes of the bearing caps. One of the constraints for the main bearings, and especially for the bearing caps 20, is that they may not interfere with the crankshaft and connecting rods of the engine. Therefore, due to the fact that it is desirable to limit the longitudinal length of the engine, and that therefore the cylinders are located as close to one another as possible, the longitudinal width of the bearing 14 and especially of the bearing cap 20 is quite limited. Therefore, each main bearing extends essentially in a vertical and transversal plane, perpendicular to the longitudinal axis A1 of the crankshaft. The bearing caps 20 shown in this embodiment have a quite conventional design optimized to resist to the forces exerted on them by the crankshaft, forces which have a main orientation along the vertical direction. They can be made of cast nodular iron.

According to a conventional cylinder block design, the cylinder block 10 has two sidewalls 28 (also called skirts, or engine block skirts) which extend essentially downwardly and longitudinally on each side of the main bearings 14. In this embodiment, the lower edge surface 30 of each sidewall is located approximately at the same horizontal level as a lower face 32 of the bearing caps 20 on which the heads 34 of the bolts 26 are pressed. Nevertheless, other designs are possible, especially with such sidewalls 28 being shorter, with a lower edge surface located above the level of the bearing caps. In this embodiment, the sidewalls have a quite sturdy construction so that they have a high rigidity along all directions.

According to the invention, the engine is provided with at least one dampening structure in order to absorb part of the vibrations in the area of the bearings 14 and of the sidewalls 28. Various examples of such dampening structures will be described hereunder. Nevertheless, each of them is formed to of at least three parts: a first support portion fixed on a bearing cap, a second support portion fixed on the engine block, and a dampening portion comprising an elastomeric material which connects the two support portions.

A first example of a dampening structure is shown on FIGS. 1 and 2. On FIG. 1, two of these dampening strictures 36 are provided, each connecting a same bearing cap 20 respectively to the two opposite sidewalls 28 of the cylinder block 10. The two dampening structures 36 are identical, the one on the left part of the figure being shown assembled, the other one being represented in exploded form.

According to this first embodiment, the first 38 and second 40 support portions of the dampening structure 36 extend essentially in the transverse direction and are each fastened respectively on the bearing caps 20 and on the cylinder block by one bolt, the two bolts being transversely spaced apart. Advantageously, the bolt for fastening the first support portion 38 on the bearing cap is one of the two fixing bolts 26 which holds the bearing cap 20 on the cylinder block, so that the first support portion 38 is in fact sandwiched between the bolt's head 34 and the lower surface 32 of the bearing cap 20. The first support portion 38 has a fixing section 42 having a certain thickness and showing a through-hole 44 for the passage of the bolt 26. A horizontal flange 46, having a reduced thickness compared to the fixing section 42, extends essentially transversally from said fixing section 42 so as to be in the continuity of the lower face thereof The second support portion 40 has a similar construction with a fixing section 48 having a certain thickness and showing a through-hole 50 for the passage of a dedicated fastening bolt 52, and a horizontal flange 54 of reduced thickness extending essentially transversally in the direction of the bearing cap.

In this embodiment, the two flange sections 46, 54 of the two support portions of 38, 40 are essentially face-to-face one to the other, i.e. they are at least partially overlapped when viewed along a vertical direction. According to the invention, the two support portions are connected one to the other by a dampening portion 58 which comprises an elastomeric material. In this first embodiment, the dampening portion 58 is fixed to the opposing faces of respectively the flange section 46 of the first support portion and of the flange section that 54 of the second support portion 40. These opposing faces are therefore contact faces between the respective support portion and the dampening portion. In this first embodiment, the dampening portion 58 is essentially a flat sheet-like piece of material having basically a rectangular contour and which is sandwiched between the two flange sections of the two support portions. The two contact surfaces of the dampening portion, which are in contact with the support portions, are substantially horizontal. This embodiment of the dampening structure has all in all a substantially flat sheet-like shape extending in the horizontal plane, with a rectangular contour having its longest dimension along the transversal direction of the engine.

As it can be seen on the figures, the dampening portion 58 is the only connection between the two support portions 38, 40. Therefore, any relative movement between the two support portions results in stresses exerted on the dampening portion.

The dampening portion 58 is affixed to the opposing contact faces of the two flange sections along their entire respective contact surfaces, or at least a substantial portion thereof. The dampening portion is preferably affixed to these contact faces by any type of adhesive bonding, be it gluing, overmoulding, welding, etc.

Due to the geometry of the dampening structure 36, and most notably the orientation of the contact surfaces between the dampening portion 58 and the support portions 38, 40, any relative movement between the two support portions in a substantially horizontal plane results in the dampening portion 58 being subject essentially to shear stresses. Therefore, taking into account the positioning of the dampening structure 36 on the engine, any relative movement between the bearing cap 20 and the sidewall 28 along a transversal direction or a longitudinal direction will result in the dampening portion 58 being subject to shear stresses. As a result, any of these relative movements or vibrations will be effectively dampened by the dampening portion over a wide range of a vibratory frequencies or wavelengths.

In its simplest form, the dampening portion 58 can be a plain rubber sheet, for example a synthetic nitril-butadiene rubber composition which is known to have a good resistance to oil and fuel. Nevertheless, other type of dampening material could be used, including more complex structures having several layers of different materials. By contrast, the support portions are relatively rigid, and that they can be for example made of metal or of a fiber reinforced resin-based material.

This first embodiment of the dampening structure 36 is fixed only at one location on each of the bearing cap 20 and of the sidewall 28 of the cylinder block, and these two locations are essentially transversely spaced apart. Moreover, the dampening portion 58 is elongated in the transversal direction. Therefore, this dampening structure 36 will be most efficient along the transversal direction, and less efficient along the longitudinal direction although active along this directions as well. Of course, it is not at all designed to perform any specific dampening in the vertical direction.

On FIG. 2 is shown a second embodiment 60 of the dampening structure according to the invention. The main difference between this second embodiment and the first one described above is in the shape of the second support portion 40 which is to be fixed on the cylinder block 10. As can be seen on FIG. 2, this second portion 40 is designed so as to be fixed on the cylinder block at two locations, it's fixing section 48 comprising two through-holes 50 located side-by-side and spaced apart longitudinally. Therefore, this second embodiment of the dampening structure 60 has essentially a triangular contour defined by the three fastening locations, two on the cylinder block and one on the bearing cap. As a result, the dampening portion 58 may have for example a substantially trapezoidal shape. With this configuration, it is apparent that this second embodiment of the dampening structure will be more efficient than the first embodiment in dampening movements or vibrations along the longitudinal direction, partly because there will be no possible rotation of the second support portion 40, and partly also because the dimension of the dampening portion 58 along the longitudinal direction will be greater than in the first embodiment.

These two first embodiments 36, 60 of a dampening structure are essentially designed to provide a dampening between the bearing and the engine block.

Figure 3:
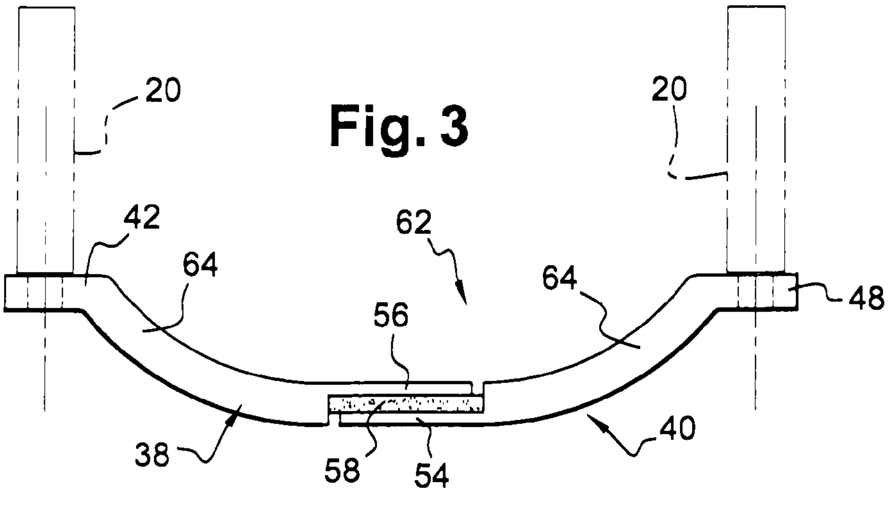
FIG. 3 is a more detailed view of a dampening structure adapted to join to bearing caps.

The third embodiment of a dampening structure 62, which is shown on FIG. 2 and in greater detail on FIG. 3, is designed to provide dampening between two adjacent bearings. The main difference between this third embodiment and the previous embodiments lies in the shape of the support portions 38, 40 which are not essentially flat. Indeed, this third dampening structure 62 needs to take into account the presence of the rotating crankshaft and of the connecting rods and must not interfere with their movement. Therefore, in the example shown, each support portion has, between ifs fixing section 42, 48 and its flange section 46, 54, an intermediate section 64 which is for example in shape of a half arch. In this embodiment, the flange sections 56, 54 are still extending along a horizontal plane but they lie at a lower level than the fixing sections 46, 48. The dampening portion 58 which connects the two support portions 46, 54 is a still a flat sheet-like element having a substantially rectangular contour and, taking into account the orientation of the dampening structure 62 on the engine, the dampening portion 58 is elongated along the longitudinal direction. The arch shape will be designed so that the dampening structure 62 does no interfere with any other engine part. This dampening structure 62 is therefore adapted to dampen the longitudinal vibrations of the bearing caps by submitting the dampening portion 58 to shear forces in the longitudinal direction. In this case, the dampening 62 structure has a symmetrical aspect in the sense that both support portions are fixed to a bearing cap, the first support portion being fixed to a first bearing cap and the second support portion being fixed to a second bearing cap. But when the same dampening structure is considered from the point of view of the second bearing cap, the naming of the support portions can be inverted. Nevertheless, it is possible that two adjacent bearing caps are not subject exactly to the same vibratory phenomena, and it is most probable that in many case, those vibratory phenomena will be at least phase-shifted. Of course, other geometries are possible for such inter-bearing dampening structures.

Figure 4:
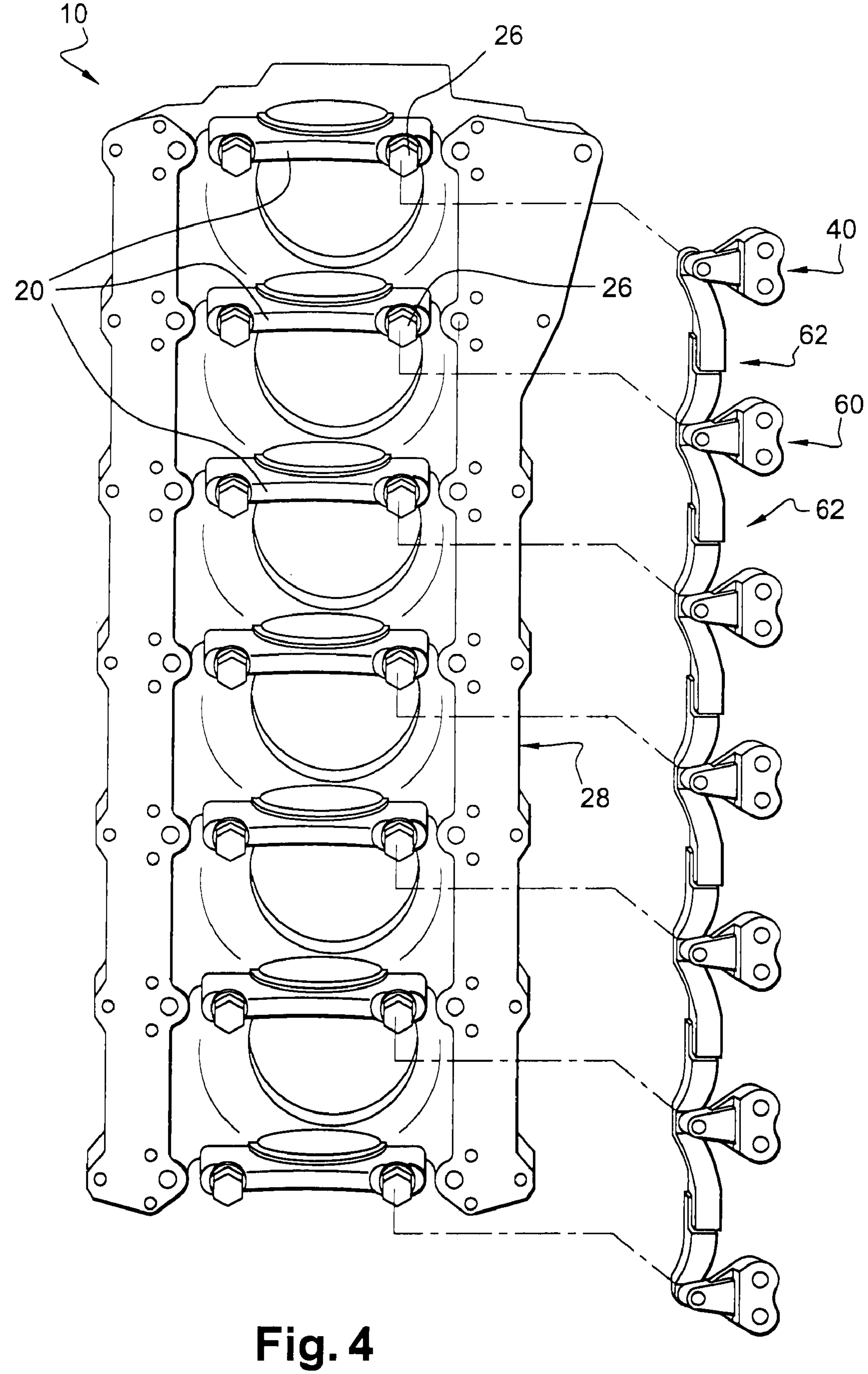
FIG. 4 is a view similar to that of FIG. 2, showing a dampening frame structure joining all the bearing caps to one side of the engine block.

On FIG. 4 is shown an embodiment of the invention where several dampening structures are combined to efficiently dampen the vibrations occurring in the bearing caps. These dampening structures are in fact a combination of several dampening structures similar to those of the second and to the third embodiments described above. Therefore, each bearing cap 20 is connected to a sidewall 28 by a dampening structure 60 similar to that of the second embodiment and is connected to the two adjacent bearing caps 20 by two dampening structures 62 similar to that of the third embodiment. In the example shown, the first and seventh bearing caps 20 at each longitudinal end of the engine are shown to be connected to only one bearing cap. Nevertheless, it could be provided that those specific bearing caps are also connected to other parts of the engine block. Apart from these two longitudinal end bearings, the other bearing caps are therefore each connected to three dampening structures. With respect to one specific bearing, each of the three dampening structures has therefore a first support portion connected to it. As shown, it is advantageous to provide that all three first support portions are connected to the bearing cap through the same fastening means, such as the bearing fixing bolt 26. Nevertheless, it could be provided otherwise. Moreover, it can be advantageous to provide that the three first support portions are made as a single integral part, or that at least two of them are integral. In the embodiment of FIG. 4, two adjacent longitudinal dampening structures 62 connected to a same bearing cap have the corresponding support portions made as a single part, while the dampening structure 60 connecting that same bearing cap to the sidewall has a separate support portion, but the two parts are fixed to the bearing through the same fixing bolt 26.

In this embodiment, the combined dampening structures form a dampening frame for the bearing caps. It is to be noted that in this embodiment, such a frame is shown only on one lateral side of the bearing caps, but of course two such frames could be provided on each side of the bearing caps. Of course, other combinations of dampening structures could be provided, especially in the case where it has been that determined that certain specific bearings are the subject of certain specific vibratory phenomena. The bearing would be then equipped with the suitably designed dampening structure(s).

Figure 5:
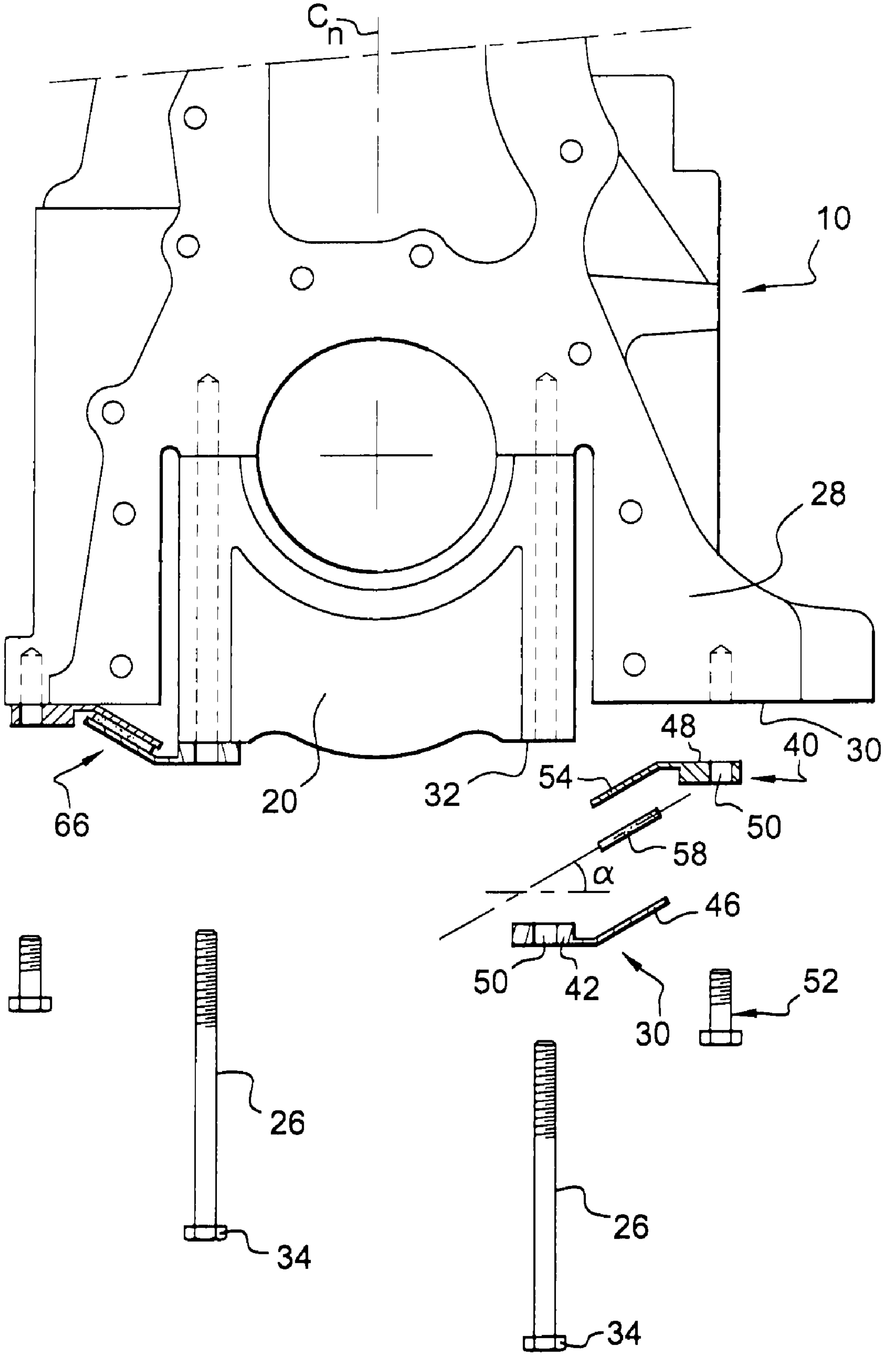
FIG. 5 is view similar to that of FIG. 1 showing another embodiment of the invention.

On FIG. 5 is shown very schematically a further embodiment 66 of a dampening structure for an engine according to the invention. In this further embodiment, it can be seen that the cylinder block 10 has shorter sidewalls 28 than in the previous cases. Indeed, the lower edge surface 30 of at least one of the sidewalls (in this case of both sidewalls) is located at a higher level than the lower surface 32 of the bearing caps. Therefore, in this case, the flange sections 46, 54 of each of the first 38 and second portions of the dampening structure extend along a plane P which is inclined by an angle a with respect to a horizontal plane (and in this case angled with respect to the corresponding fixing section 42, 48). The degree of inclination a will depend on the difference of height between the lower edge surface 30 of the sidewalls and of the bearing caps. It will also depend on the height of the fixing sections of the dampening structure. In the embodiment shown, the fixing sections and the flange sections of the support surfaces have approximately the same thickness. In this case, the dampening portion 58 is still designed as a flat sheet-like element which is fixed by two opposing surfaces to the flange sections 46, 54 of the corresponding support portion 38, 40. The dampening portion 58 also extends along the above mentioned inclined plane P. Nevertheless, it is apparent that even with this design, longitudinal and transversal vibrations or movements of the bearing caps with respect to the sidewalls will still result in the dampening portion 58 being subject to shear forces. As long as the inclination a of said inclined plane with respect to the horizontal plane is less than 45 degrees, it can be considered that transversal vibrations will result mainly in shear stresses imposed to the dampening portion 58. Of course, the higher this degree of inclination, the higher will be the amount of other types of stresses also exerted on the dampening portion, such as traction-compression stresses.

In each of the cases shown above, the dampening portion 58 has a sheet-like shape where the two faces of the sheet are those which are fixed to the corresponding support portion. By sheet-like shape, it is understood that the dampening portion has one dimension which is substantially smaller than that of the smaller of its two other dimensions, for example of 4 to 10 times smaller. The dampening portion could for example have an area in the range of one to several square centimeters, and a thickness in the range of 1 to 5 millimeters. Nevertheless, the invention could also be carried out using dampening portions having a more important thickness between its two contact surfaces.

As it is apparent from the above description, the dampening structure is preferably attached to the bearing cap rather than to the bearing structure. Most preferably, it is attached to the lower surface of the bearing cap, i.e. the surface which is furthest to the bearing cap's contact surface on the cylinder block. Indeed, in most cases, the lowermost surface is the part of the bearing where the amplitude of the vibrations/movements is maximum. With this positioning of the attachment point of the dampening structure, an optimum dampening effect can be achieved in most cases. Nevertheless, in some cases, it may be preferable that the dampening structure be fixed to another portion of the bearing cap.

In the above described embodiments, the dampening structure is an independent element from the bearing cap and from the engine block, i.e. a stand-alone part, and it is fixed to the engine block and the bearing cap by removable fastening means, here in the form of bolts, but which could be of any equivalent form.

Nevertheless, it could be provided that the fastening means are permanent. A first example could be that at least one of the two support portions of the dampening structure is made integral or bonded (by welding, by gluing, etc.) with the corresponding bearing cap or part of the engine block. A second example would deal with the use of rivets for example.

As it had been noted above, the use of a dampening element subject to sheer stress rather than to traction/compression stresses is advantageous in terms of dampening efficiency over a wider scope of frequencies. According to the above embodiments, it is to be noted that the “working plane” of the dampening element, that is the plane containing the major directions along which the dampening portion is stressed, is at least mainly perpendicular to the main direction along which the dampening structure is fastened on the engine. Indeed, in the embodiments above, the dampening structure is fastened on the engine by vertically oriented bolts. Therefore, the fasteners exert on the dampening structure a tightening force which is oriented along a substantially vertical direction, and therefore perpendicular to the horizontal plane along which extends the “working plane” of the dampening portion. Thanks to this feature, dimension discrepancies related to the mounting and positioning of the dampening structure should have a very limited effect on the working of the dampening structure, notably because those possible discrepancies should not cause any significant pre-stressing of the dampening portion, at least along its “working plane”. It is to be noted that this feature can be obtained also in the context of the embodiment of FIG. 5, simply by changing the orientation of the fastening bolt 52 by which the second support portion is fastened on the cylinder block. This could involve having the fixing section 48 of the second support portion aligned with the flange section 54 along the same inclined plane P. Another option could be to have the lower edge surface 30 of the sidewall 28 and the lower surface 32 of the bearing cap 20 both inclined along a same plane P. In such a case, a dampening structure such as the one described in relation to the first embodiment 36 can be used, only with a different non-horizontal orientation.

In certain cases, only the dampening of the bearings along a transverse direction will be of great concern. Then, to easily reach the above objective of not pre-stressing the dampening portion, it will be sufficient that the tightening direction of one the fastening means of the dampening structure is substantially contained within a plane containing the vertical and longitudinal directions.

On FIGS. 6 to 10 is shown an optimized design of a dampening assembly 70 according to the invention which synthesizes the features of the dampening frame depicted above in relation to FIG. 4.

Figure 6:
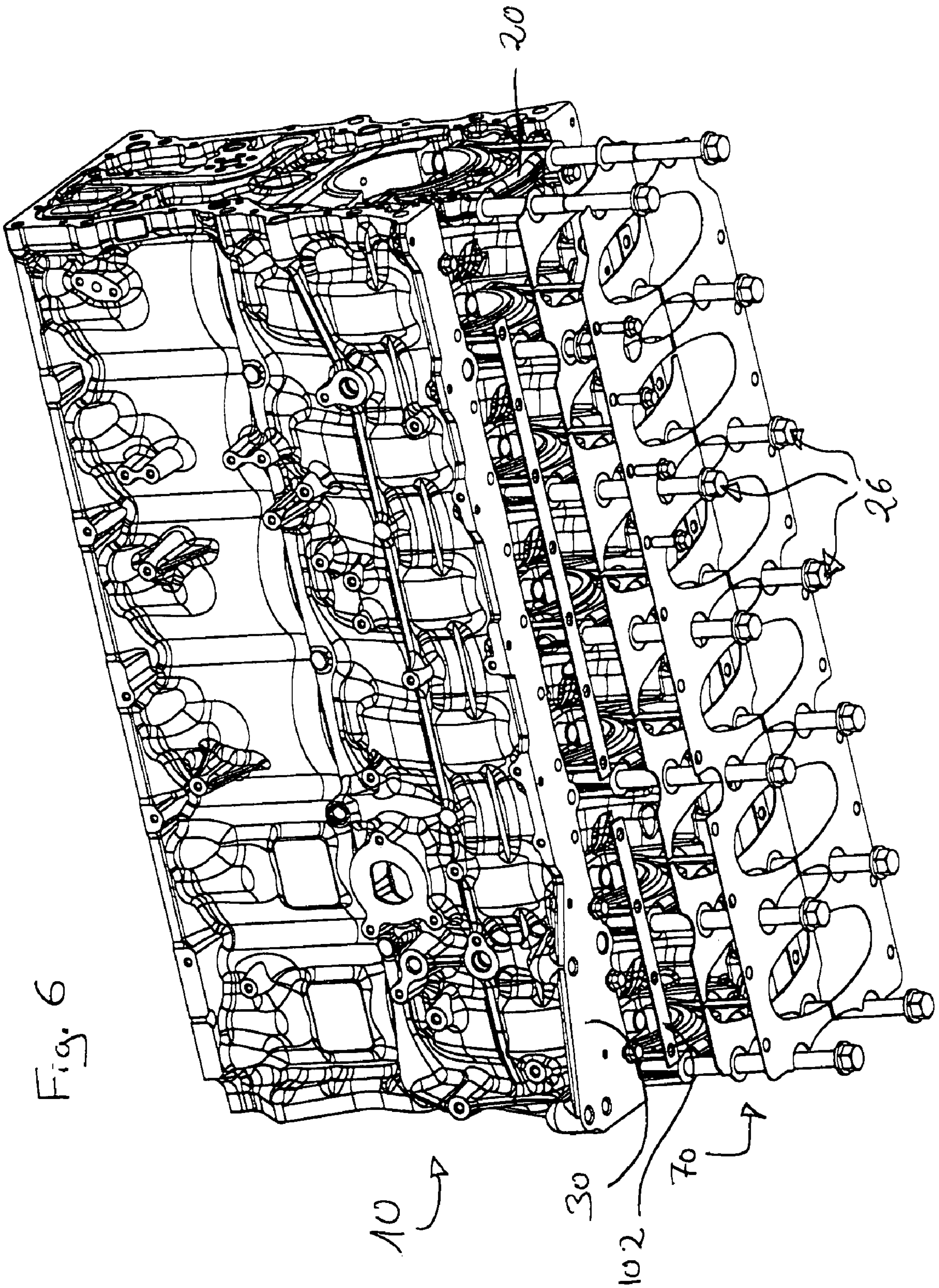
FIG. 6 is a perspective exploded view of an engine block from below, with a further embodiment of a dampening assembly according to the invention.
Figure 7:
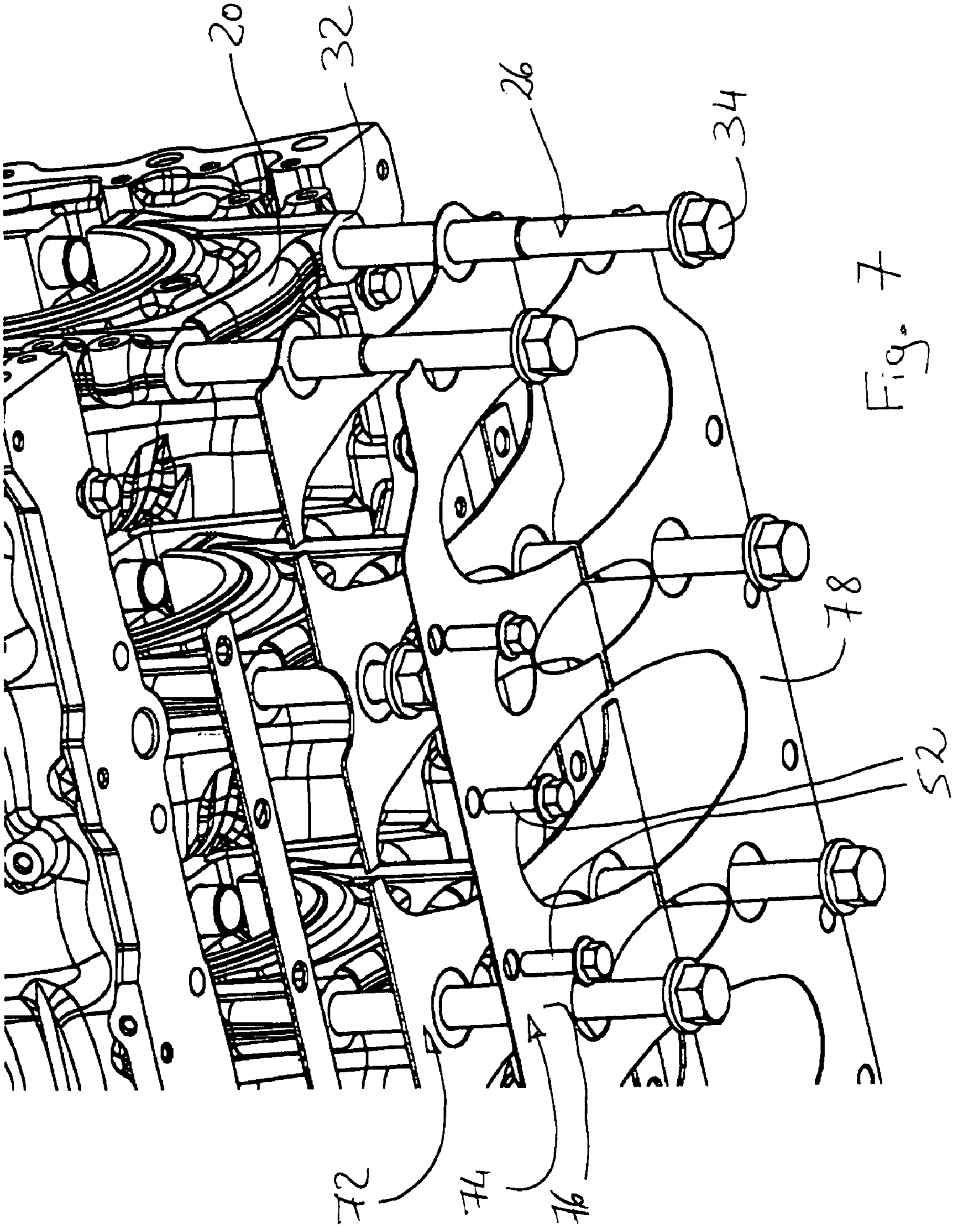
FIG. 7 is an enlarged view of a portion of the view of FIG. 6, showing more details of the dampening assembly.
Figure 8:
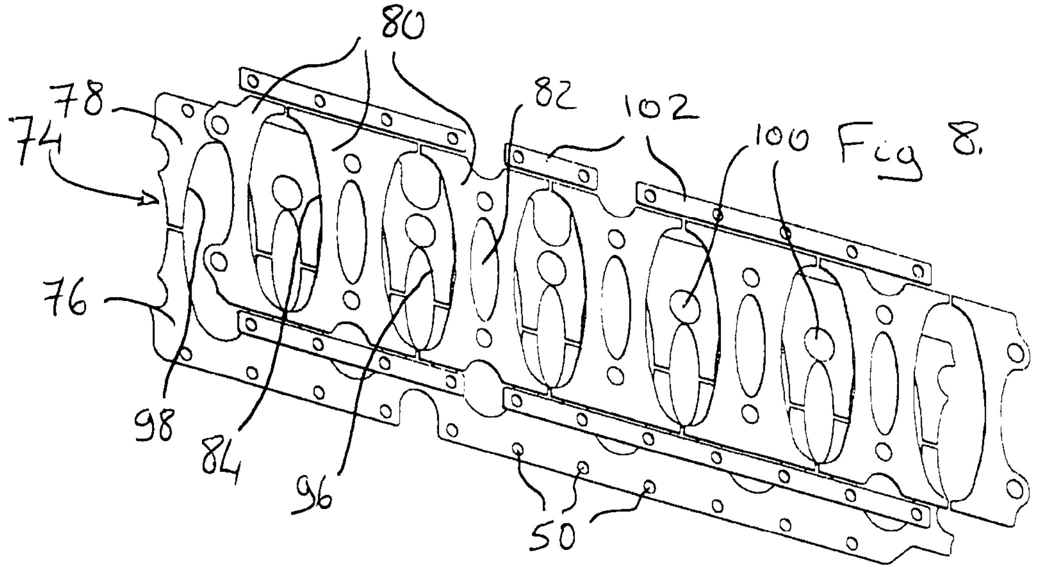
FIG. 8 is a perspective exploded view of the dampening assembly of FIG. 6 viewed from the top.

As it can be seen from FIG. 6, the dampening assembly 70 is essentially equivalent to two dampening frames as shown on FIG. 4, for both sides of the engines. The dampening assembly 70 is essentially sheet-like, in that it has a reduced thickness compared to its two other dimensions. In this embodiment, the dampening assembly 70 is flat, thanks to the fact that the lower edge surface 30 of each sidewall is located approximately at the same horizontal level as a lower face 32 of the bearing caps 20 on which the heads 34 of the bolts 26 are pressed.

The dampening assembly comprises an upper layer 72 made of a series of distinct plates 80 which are to be connected to the bearing caps 20, and a lower layer 74 made of two distinct plates 76, 78 which are each connected to one of the engine block sidewalls 28. With each bearing cap 20 is associated one upper plate 80 of the assembly 70.

Figure 10:
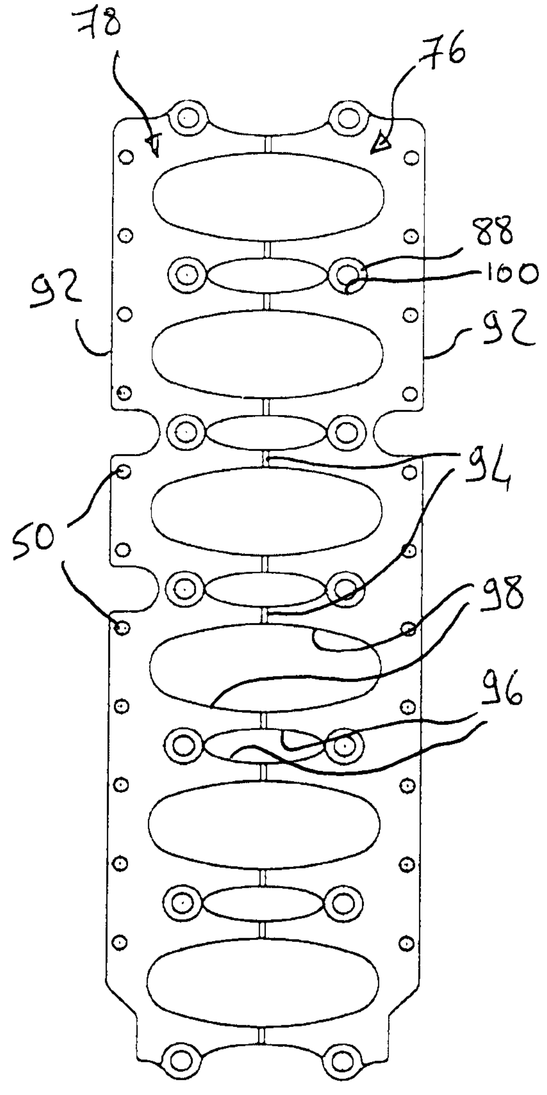
FIGS. 9 and 10 are plan views of the dampening assembly of FIG. 6, viewed respectively from the top and from the bottom.
Figure 9:
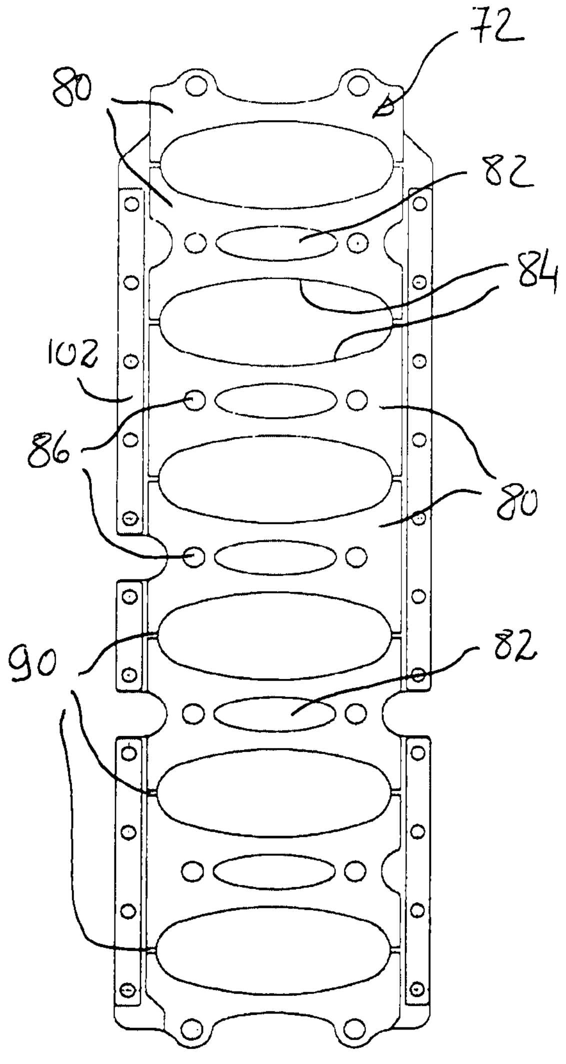

Each upper plate 80 is affixed to the corresponding bearing cap 20 by being serrated between the bolt heads 34 of the bolts 26, which fasten the bearing cap to the engine block, and the lower surface 32 of the bearing caps. As can be seen, each upper plate 80 is fastened to the bearing cap 20 through the two bolts 26. As can be seen particularly on FIG. 9, the upper plates 80 extend side by side so as to occupy a maximum of the horizontal surface available under the engine block. Except for those corresponding to the first and seventh bearing caps, each upper plate 80 has a transversally elongated central aperture 82 to accommodate a protruding part of the corresponding bearing cap 20 and each upper plate 80 has a side cut 84, which, in combination with a mirror side cut 84 of a neighbouring upper plate, define the passage way for the corresponding crankshaft crankpin. Each upper plate 80 also has two fixing holes 86, at both transversal extremities of the central aperture 82, through which extend the fixing bolts 26. The annular surface 88 around each said fixing holes 86, visible on FIG. 10, is the surface on which the bolt heads 34 are serrated to fix the upper plate 80 to the corresponding bearing cap. In this design, each upper plate is essentially X shaped, apart from the first and seventh upper plates, and they are contiguous one to the other, so that each extremity of the X almost touches the extremities of the neighbouring plate. Nevertheless, the upper plates are distinct one from the other, so that a longitudinal gap 90 is provided between two neighbouring plates. It is to be noted that the upper plates 80 have a transversal dimension which is smaller than the distance between the two sidewalls 28 of the engine block, so that the upper plates can in no way interfere with said sidewalls.

The lower plates 76, 78 are mirror images of each other on each side of a vertical and longitudinal plane containing the cylinder axis Cl to C6. Each lower plate 76, 78 has a external longitudinal edge 92 by which it is to be fixed to the corresponding sidewall by bolts 52 extending through corresponding through-holes 50 arranged along the external longitudinal edge 92. The inner longitudinal edges of the lower plates 76, 78 are arranged face to face and are separated by a transversal gap 94. The inner edges of the lower plates have deep side cuts 96, 98 which, when the lower plates are side by side, demarcate apertures corresponding exactly to the central apertures 82 of the upper plates and to the passage ways for the corresponding crankshaft crankpins. The lower plates 76, 78 exhibit holes 100 through which the heads 34 of bolts 26 can be inserted without interference, so that the lower plates are not in contact with said bolts 26. It is to be noted that the lower layer 74 is transversally wider than the upper plates.

The upper plates 80 and the lower plates 76, 78 can be made of metal, or of any other rigid material, including resin-based reinforced composite materials. They can have a thickness of less than 7 millimeters, preferably within of the range of 0.3 to 4 millimeters.

Between the two upper and lower layers, a dampening layer is provided, which is not apparent on the figures but which in fact covers almost entirely the lower surface of the upper layer 72, except for the annular contact surfaces 88 on which the heads 34 of the bolts 26 are pressed. The dampening layer is also sheet-like and flat. It extends along the entire overlapping surfaces of the upper and lower layers. It can be made of rubber and it is adhered through its entire contacting surfaces to both the lower layer 74 and the upper layer 72. The dampening layer will have a thickness of preferably less than 5 millimeters and optimally less than 2 millimeters. It is expected than a thickness comprised between 0.4 and 1 millimeter should be optimal.

On the figures, it also shown two spacer bars 102 which are to be sandwiched each between the external longitudinal edge 92 of the lower plates 76, 78 and the corresponding sidewall 28. The spacer bars 102 have a thickness corresponding to the combined thickness of the upper plates 80 and of the dampening layer. The spacer bars 102 do not interact with the upper layer or with the dampening layer and simply allow tightening the lower plates 76, 78 on the engine block without distorting the dampening assembly 70. The spacer bars 102 are preferably of the same material as the lower plates, and could be integral therewith.

The dampening assembly 70 is therefore a flat, sheet-like, horizontal sandwich structure having an upper layer fixed exclusively to the bearing caps and a lower layer exclusively and independently fixed to both sidewalls of the engine block, with a dampening layer in between. Compared to the previous examples, the lower and upper layers have a great amount of overlapping. Basically, due to the design of the assembly, the overlapping surfaces represent more than 90 percent of the total area of the upper plates, which themselves extend along a surface as big as possible when taken into account the possible interferences with other elements of the engine. Thanks to this design, the area of the "working plane" of the dampening layer is maximized, allowing for a very efficient dampening. Thanks to the dampening assembly 70, each bearing cap is connected through a dampening structure independently to both side walls, and, independently, to both neighbouring bearing cap, except of course for the first and seventh cap which are connected to only one other bearing cap. The dampening layer is the only direct connection between two upper plates 80, due to gaps 90, and the only direct connection between an upper plate and any of the side walls. Also, the dampening layer is the only direct connection between the two lower plates, due to gap 94. It is to be noted that the gaps 90 and 94 are not coincident, so that gaps 90 face a solid part of the lower plates 76, 78 while gap 94 faces a solid part of the upper plates 80. Therefore, even if the rigidity of the dampening layer is low, the damping assembly will have at least the rigidity of one of its upper or lower plates. Also, the dampening layer can or not cross the gaps 90, 94.

In terms of function, each transversal half of an upper plate 80 is the strict equivalent to the first support portions of the three dampening structures which are affixed to the same bearing cap in the example of FIG. 4, where the first support portions would be integral one with the other. Similarly, each lower plate is the strict equivalent to the corresponding second support portions of the equivalent dampening structures for the corresponding side of the engine. The dampening assembly is therefore such that it can transform all vibrations between the bearing caps and the engine sidewalls along a longitudinal and a transversal direction into shear stresses in the dampening layer, thereby achieving an optimal dampening.

The dampening assembly can be easily manufactures from sheet materials which can be pre-cut and adhered one to the other. It can also be obtained from a prefabricated sandwich element in which the holes, side cuts and gaps are manufactures by various techniques such as laser cutting, punching or milling. In all cases, the dampening assembly 70 is a standalone unitary part. Such an assembly can be easily integrated within an existing engine design, between the engine block and the oil pan, without any major redesign of these two parts. As with the other designs, this dampening assembly is tightened to the engine block and to the bearing caps by bolts 26, 50 along a substantially vertical direction, perpendicular to the "working plane" of the dampening portion. Therefore, the tightening of the dampening assembly does not induce any pre-stress on the dampening material along the horizontal plane containing the longitudinal and transversal directions which are its privileged working directions.

The invention claimed is:

1. An internal combustion engine comprising an engine block comprising, at least one cylinder extending along a cylinder axis, first and second main bearings, a crankshaft mounted on the engine block by at least the first and second main bearings so as to be rotatable around a longitudinal crankshaft axis, the first and second main bearings each comprising, a first bearing portion and a second bearing portion, the second bearing portion being pan of a bearing cap, the bearing cap being fixed on the engine block by fixing means, at least one dampening structure connecting at least the bearing cap of the first main bearing to the bearing cap of the second main bearing, the dampening structure comprising a first support portion fixed on the bearing cap of the first main bearing, a second support portion fixed on the bearing cap of the second main bearing, and a dampening portion comprising an elastomeric material which connects the two support portions, the dampening structure being configured so that any relative movement between the bearing cap of the first main bearing and the bearing cap of the second main bearing, along a substantially horizontal direction, including longitudinal and transversal directions, results in the dampening portion being subject mainly to shear stress, left and right longitudinal side walls of a cylinder block extending vertically on left and right sides of the first and second main bearings, each of the first and second main bearings being connected by a left dampening structure to the left side wall and by a right dampening structure to the right side wall, the left and right wall dampening structures each having a first support portion of the wall dampening structure fixed on a respective one of the bearing cap of the first main bearing and the bearing cap of the second main bearing, a second support portion of the wall dampening structure fixed on the left side wall and the right side wall, the first support portion of the wall dampening structure being connected to the second support portion of the wall dampening structure by a dampening portion of the wall dampening structure comprising an elastomeric material, the left and right wall dampening structures being configured so that any relative movement between the bearing cap and the engine block, along a. substantially horizontal direction, including longitudinal and transverse directions, results in at least one of the left and right wall dampening structure being subject mainly to shear stress.

2. An engine according to claim 1, wherein at least one of the first or second support portion is fixed on a respective one of the first or second bearing cap by fastening means, the fastening means imparting a tightening force on the support portion along a main tightening direction, and in that the main tightening direction is substantially vertical.

3. An engine according to claim 1, wherein the fixing means of the at least one of the first or second support portion fixed on the respective one of the first or second bearing cap on the engine block and the fastening means are the same means.

4. An engine according to claim 1, wherein the dampening portion of the dampening structure has a first contact surface in contact with the first support portion and a second contact surface in contact with the second support potion, and at least one of the contact surfaces has a generally horizontal orientation.

5. An engine according to claim 4, wherein the two contact surfaces of the dampening portion have a generally horizontal orientation.

6. An engine according to claim 1, wherein the dampening portion of the dampening structure has a first contact surface in contact with the first support portion and a second contact surface in contact with the second support potion, and the two contact surfaces of the dampening portion are at least partially overlapped in a vertical direction.

7. An engine according to claim 1, wherein the dampening portion has a flat sheet-like geometry.

8. An engine according to claim 1, wherein the dampening portion of the dampening structure is adhesively affixed to the first and second support portions of the dampening structure.

9. An engine according to claim 1, wherein the dampening structure is a stand-alone part detachably or permanently fixed to the engine block and/or to one of the bearing caps.

10. An engine according to claim 1, wherein the first support portion of the dampening structure is integral with the bearing cap of the first main bearing.

11. An engine according to claim 1, wherein the second support portion of the dampening structure is integral with the bearing cap of the second main bearing.

12. An engine according to claim 1, wherein at least two dampening structures have one support portion in common and form a dampening frame.

13. An engine according to claim 12, wherein the dampening frame extends to all the bearing caps.

14. An engine according to claim 13, wherein the dampening frame connects each of the first main bearing and the second main bearing with one side wall.

15. An engine to claim 14, comprising separate left and right dampening frames, each dampening frame connecting each of the first main bearing and the second main bearing with one side wall.

16. An engine according to claim 15, comprising a dampening assembly formed of separate left and right dampening flumes, each frame connecting the first main bearing and the second main bearing with one side wall, and each left and right frame extending to the bearing cap of the first main bearing and the bearing cap of the second main bearing and each frame being formed of at least two dampening structures having one support portion in common.

17. An engine according to claim 16, wherein the dampening assembly is sheet-like and comprises a first layer fixed exclusively to the bearing cap of the first main bearing and the bearing cap of the second main bearing, the first layer being made of a series of distinct plates which are connected to the bearing cap of the first main bearing and the bearing cap of the second main bearing, each bearing cap of the first main bearing and the second maw bearing being associated with one plate forming first support portions of dampening structures affixed to the bearing cap, a second layer fixed exclusively and independently to both the left and right side walls, the second layer being made of two distinct plates which are each connected to one of the left and right side walls, each plate forming a second support portion of dampening structures for the corresponding one of the left and right side walls, and a dampening layer provided between the first and second layers.

18. An engine according to claim 1, wherein the engine comprises a dampening assembly, the dampening assembly being sheet-like and comprising a first layer fixed exclusively to the bearing cap of the first main bearing and the bearing cap of the second main bearing, the first layer being made of a series of distinct plates which are connected to the bearing cap of the first main bearing and the bearing cap of the second main bearing, each bearing cap of the first main bearing and the second main bearing being associated with one plate forming first support portions of dampening structures affixed to the bearing cap, a second layer fixed exclusively and independently to both the left and right side walls, the second layer being made of two distinct plates which are each connected to one of the left and right side walls, each plate forming a second support portion of dampening structures for the corresponding one of the left and right side walls, and a dampening layer provided between the first and second layers, the dampening layer having a first contact surface adhesively affixed to the first support portion and a second contact surface adhesively affixed to the second support portion, the two contact surfaces of the dampening layer being at least partially overlapped in a vertical direction.

* * * * *